United States Patent
Boschet et al.

(10) Patent No.: US 7,913,952 B2
(45) Date of Patent: Mar. 29, 2011

(54) METHOD AND A DEVICE FOR DE-ICING AN AIRCRAFT WALL

(75) Inventors: Patrick Boschet, Montigny le Bretonneux (FR); Bruno Lorcet, Les Ulis (FR)

(73) Assignee: Eurocopter, Marignane Codex (FR)

( * ) Notice: Subject to any disclaimer, the term of this patent is extended or adjusted under 35 U.S.C. 154(b) by 774 days.

(21) Appl. No.: 11/869,015

(22) Filed: Oct. 9, 2007

(65) Prior Publication Data
US 2008/0251642 A1 Oct. 16, 2008

(30) Foreign Application Priority Data
Oct. 9, 2006 (FR) .................................... 06 08824

(51) Int. Cl.
*B64D 15/14* (2006.01)
(52) U.S. Cl. .................................................. 244/134 D
(58) Field of Classification Search .............. 244/134 D, 244/134 R
See application file for complete search history.

(56) References Cited

U.S. PATENT DOCUMENTS

| 1,819,497 A | | 8/1931 | Chisholm |
| 2,547,934 A | | 4/1951 | Gill |
| 2,552,075 A | * | 5/1951 | Van Daam ................ 244/134 D |
| 4,060,212 A | | 11/1977 | Magenheim |
| 4,386,749 A | * | 6/1983 | Sweet et al. .............. 244/134 D |
| 4,399,967 A | | 8/1983 | Sandorff |
| 4,458,865 A | | 7/1984 | Sandorff |
| 4,501,398 A | | 2/1985 | Sandorff |
| 5,553,815 A | * | 9/1996 | Adams et al. ............. 244/134 R |
| 6,129,314 A | * | 10/2000 | Giamati et al. ........... 244/134 R |
| 6,338,455 B1 | * | 1/2002 | Rauch et al. .............. 244/134 D |
| 6,858,823 B1 | * | 2/2005 | Bedard et al. ................. 219/618 |
| 2005/0184193 A1 | | 8/2005 | Bourjac et al. |

* cited by examiner

*Primary Examiner* — Tien Dinh
(74) *Attorney, Agent, or Firm* — Brooks Kushman P.C.

(57) ABSTRACT

A device for de-icing an aircraft wall that comprises a composite structure (47) and layer (41) of electrically conductive material, which device comprises a plurality of thin inductor elements (33 to 35) designed to extend substantially parallel to the layer of conductive material at a distance therefrom that is small enough to ensure that when the inductor is powered by an AC source of appropriate frequency, the layer or skin heats rapidly and uniformly, without significantly heating the composite structure.

18 Claims, 4 Drawing Sheets

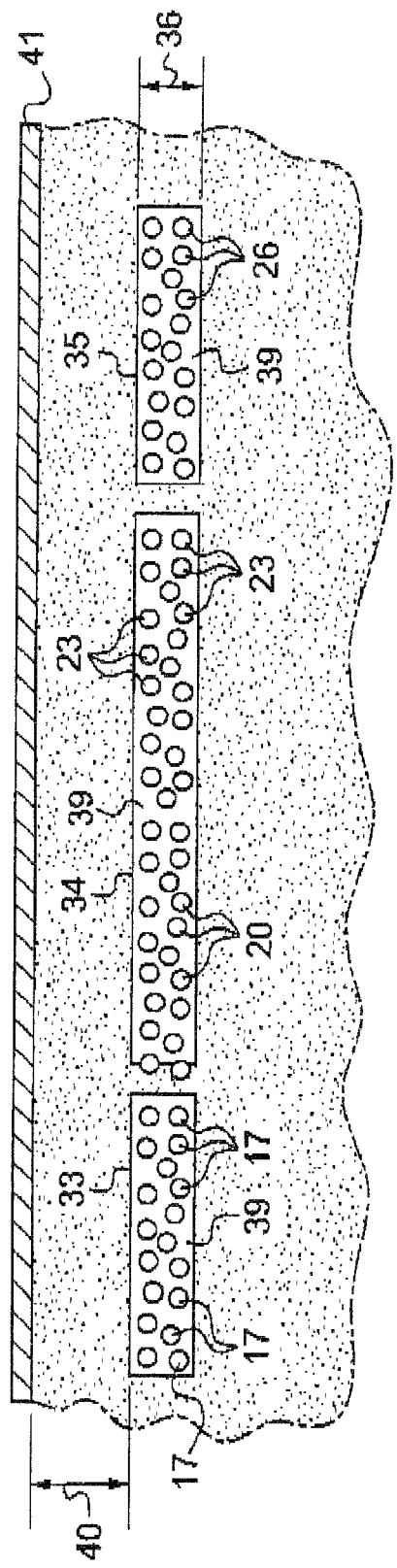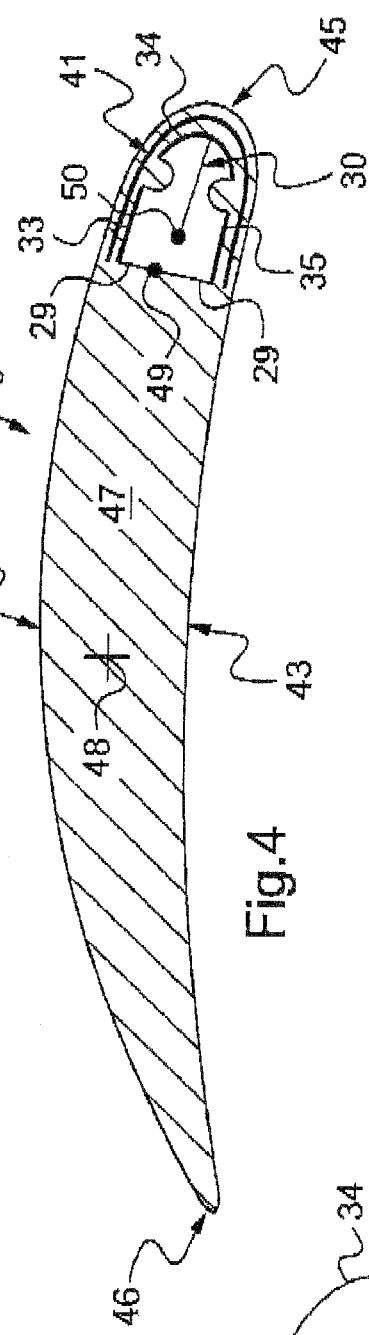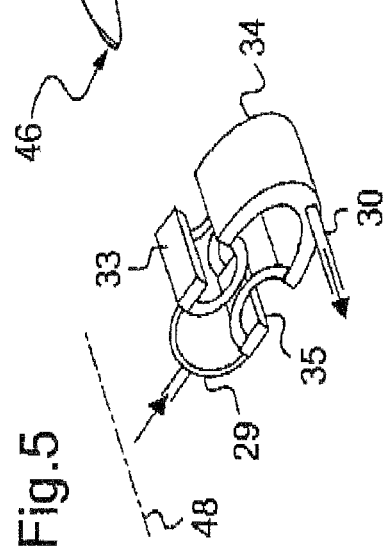
Fig.3
Fig.4
Fig.5

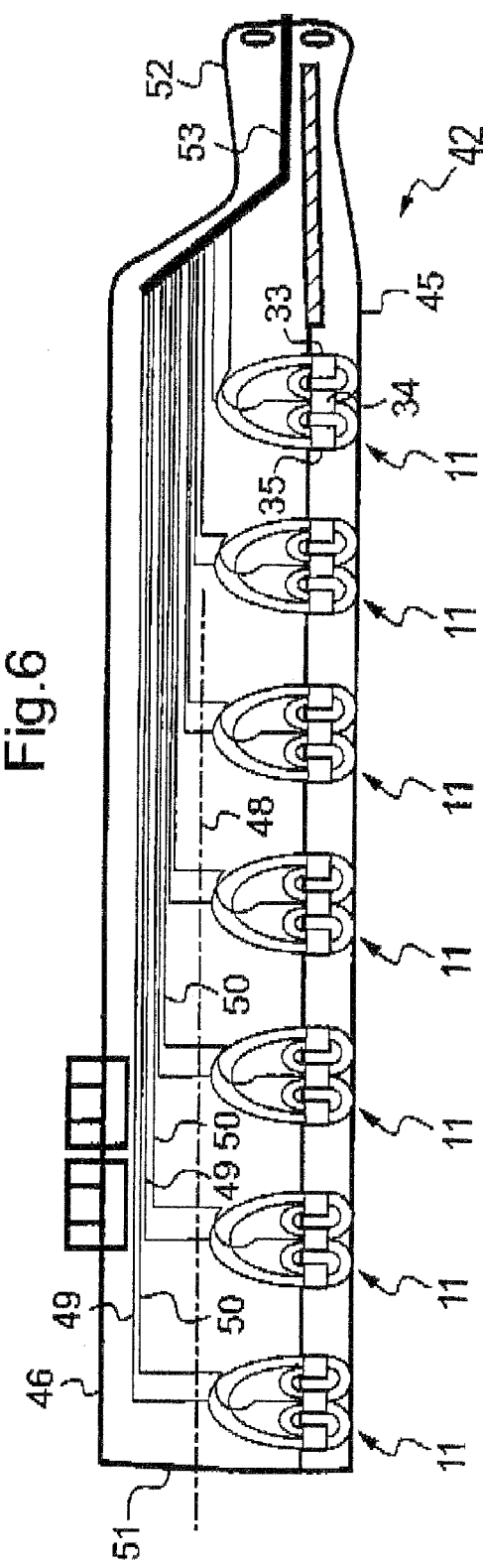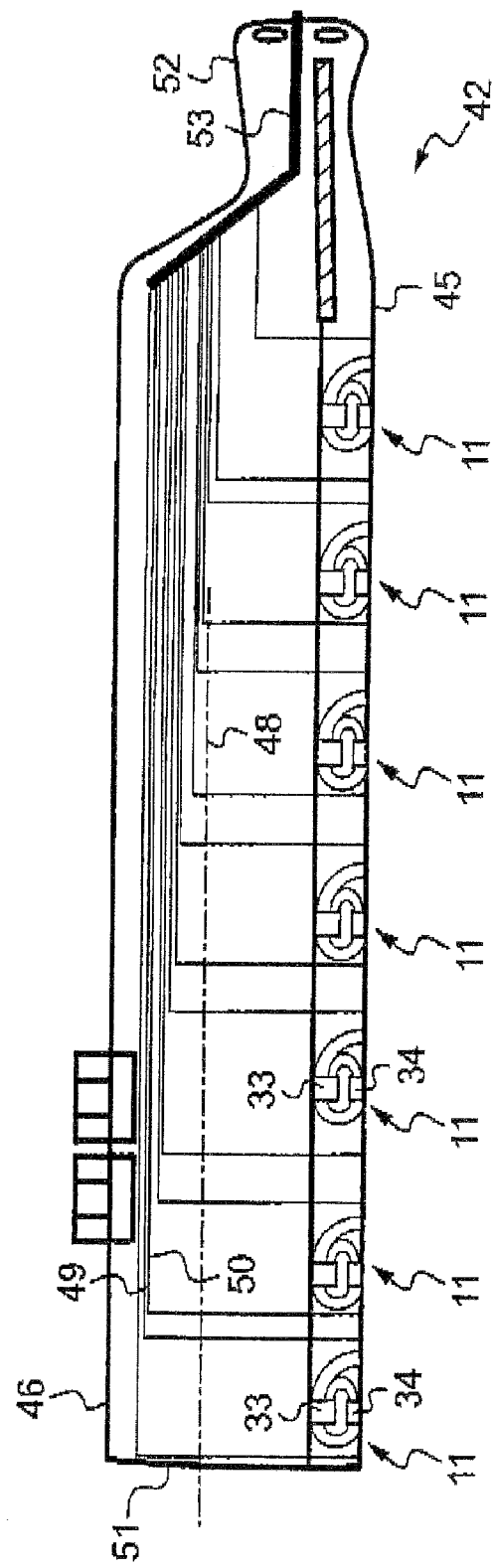

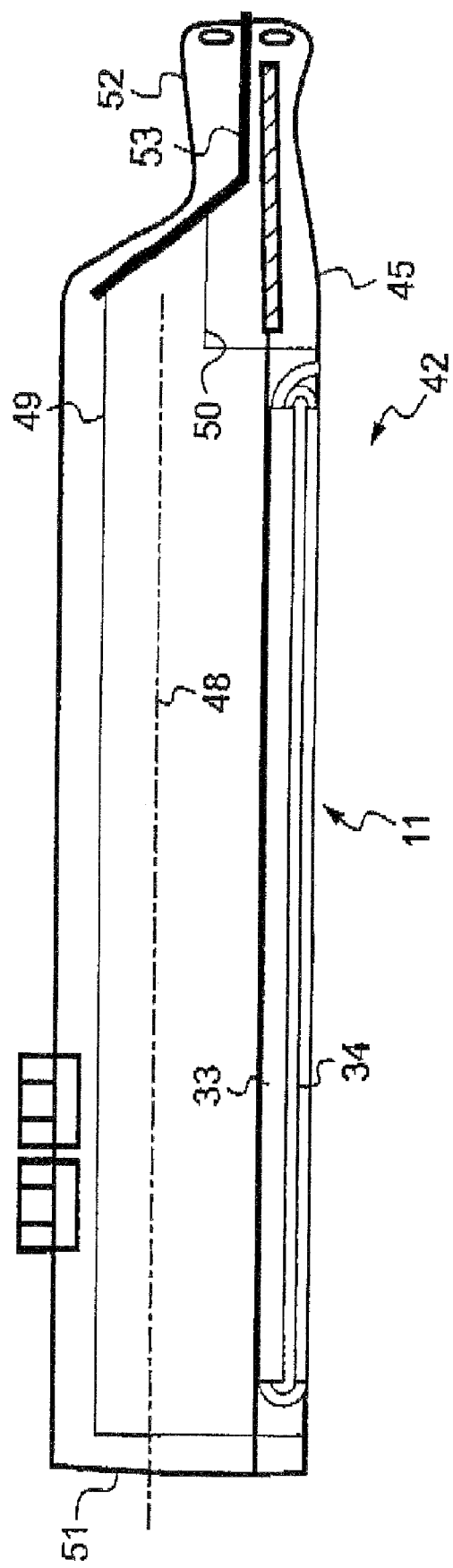

METHOD AND A DEVICE FOR DE-ICING AN AIRCRAFT WALL

The present invention relates to a method and a device for de-icing an aircraft wall.

The technical field of the invention is that manufacturing helicopters.

BACKGROUND OF THE INVENTION

The present invention relates more particularly to a method and a device for heating the outside face of a wall of a rotorcraft in order to avoid ice forming and/or accumulating on the said face, and to a rotorcraft wall—in particular a blade of a lift and propulsion rotor—fitted with such a device.

It is well-known that ice forming and accumulating on an outside surface of an aircraft can rapidly modify the aerodynamic characteristics of said surface; in particular when said surface is a rotary wing of a rotorcraft, such icing can cause the rotorcraft to crash.

A large amount of research has been undertaken to prevent or combat the formation of ice.

In U.S. Pat. No. 4,060,212 and FR-2 346 217, proposals are made for a de-icing device using microwaves; in U.S. Pat. No. 4,399,967, U.S. Pat. No. 4,458,865, and U.S. Pat. No. 4,501,398, proposals are made for de-icing the skin of a wing by deforming the skin by using electromagnetic pulses.

Proposals are made for in U.S. Pat. No. 1,819,497 for fitting an airplane wing with a conductor loop that is powered by a high-frequency electric current source in order to induce currents in the metal structure of the wing, heat said structure, and consequently combat icing. The same principle is proposed in U.S. Pat. No. 2,547,934 for de-icing the stator vanes of an air compressor.

Nevertheless, until now, it has not been possible to develop effective induction heating of an aircraft wall, in particular for heating the rotor blades of a rotorcraft; such blades are therefore generally heated by conduction, for example as described in patents US-2005/184193 and FR-2 863 586.

Furthermore, heating an aircraft wall made of composite material comprising reinforcing fibers or fabric embedded in a thermoplastic or thermosetting resin by means of conduction (by the Joule effect), can lead to "hot" points or zones appearing within the wall, and to consequent deterioration of the composite structure.

OBJECTS AND SUMMARY OF THE INVENTION

An object of invention is to propose a method and a device for de-icing an aircraft wall, and an aircraft wall including such a device, that is/are improved and/or that remedy(ies), at least in part, the shortcomings or drawbacks of prior de-icing systems, while also obtaining good efficiency.

In one aspect, the invention provides a device for de-icing an aircraft wall comprising a composite structure and a layer or skin constituted by an electrically conductive material, in particular a metal or metal alloy based on iron (such as steel), nickel, or titanium, the device comprising a plurality of thin inductor elements, in particular in the form of plates or shells, that are designed to extend substantially parallel to the layer or skin of conductive material at a distance therefrom that is small enough to ensure that, when the inductor is powered by an alternating current (AC) source of appropriate frequency, the layer or skin heats rapidly and uniformly, without significantly heating the composite structure.

In another aspect, the invention provides an aircraft part, in particular a rotor blade for a rotorcraft, which part comprises a composite structure of reinforcement embedded in a resin, together with an electrically conductive skin covering a portion of the composite structure, and inductors placed within the composite structure that are electrically insulated from the skin by the resin and that are designed to cause the skin to be heated by induction when they are powered.

Preferably, the inductors comprise (flat) coils of conductor wire and have a large number of turns or loops. The inductor may also be in the form of a fabric or a knit made of insulating glass fibers and of conductive Litz wires and impregnated with an organic matrix. The fabric may be powdered, and may present a weave or stitch of the serge, taffeta, or satin type.

In a preferred embodiment, the thickness of a coil and/or of an inductor is less than its diameter—or equivalent diameter—, and in particular less than one tenth of its diameter—or equivalent diameter.

Because they are thin, the coils and the inductors can be shaped so that they extend along a surfacer which may be plane or in the form of a portion of a cylinder or of a shell that matches the shape of the skin to be heated, so that the effectiveness of the induction is increased by the field lines, and thus the current density, being distributed more uniformly so as to make the heating of the metal element more uniform, which element may be made of stainless steel, titanium, nickel, and alloys thereof, e.g. using cobalt (Ni—Co). The resulting induced current then acts by the Joule effect to heat the metal element subjected to the magnetic field.

In a preferred embodiment, each inductor coil comprises several tens or hundreds of conductor wire turns or loops that are side by side and/or interleaved, likewise in order to improve the effectiveness of the induction.

According to other characteristics of the invention, that are preferred:

- each coil is elongate in shape along an axis and comprises two sheets of braided or twisted Litz wire that extend substantially parallel to the axis of the coil, the two sheets being separated by a space having no inductor wires;
- each inductor comprises two such coils in juxtaposition, with each sheet of each coil comprising several tens or hundreds of portions (or segments) of braided wire;
- the diameter of the conductor wire used for forming the inductors is less than or equal to about 2 millimeters (mm), and in particular is of the order of about 0.2 mm to about 1 mm, thus making it easier to integrate the wire within the fibers or the fabric of the layers of a composite material and limiting losses in the inductors;
- a weave or stitch of the balanced serge type or of the hybrid type (glass fiber/carbon fiber/Litz wire) can serve to increase the strength of the fabric used in making the inductor and also to increase the deformability of the fabric once woven;
- a large number of Litz wires serves to increase current density, to obtain overlap between field lines, and to ensure the leading edge is heated uniformly;
- the fabric may be powdered and subjected to a shaping cycle so as to obtain the final shape for the inductor and/or so as to make it possible to infusion inject an impregnation resin and to polymerize the resin so as to obtain a finished part ready for being adhesively bonded between the leading edge and the rotorcraft blade.

In another aspect, the invention provides a method of de-icing such an aircraft wall, in which method the inductors are powered with electric current at a frequency lying in the range 10 kilohertz (kHz) to 100 kHz, preferably in the range 40 kHz to 70 kHz, in particular close to about 50 kHz.

BRIEF DESCRIPTION OF THE DRAWINGS

Other aspects, characteristics, and advantages of the invention appear in the following description, which refers to the accompanying drawings and which shows, without any limiting character, preferred embodiments of the invention.

FIG. 3 is a diagrammatic view, in section in a plane that is perpendicular to the axis of the sheets of coils of an inductor, showing the disposition of the conductors forming the sheets and embedded in the resin and/or integrated in a composite structure; FIG. 3 is a view on III-III of FIG. 2.

FIG. 4 is a diagrammatic view in cross section (relative to the longitudinal axis of a blade) showing how the sheets of an inductor are implanted close to a metal insert integrated in the blade of a rotorcraft rotor, in the vicinity of its leading edge.

FIG. 5 is a diagrammatic perspective view showing an inductor similar to that of FIGS. 2 and 3, in which the shape of the coils matches the shape of an insert in the leading edge of the blade of a helicopter rotor as in the configuration shown in FIG. 4.

FIGS. 6 to 8 show three respective configurations for implanting an inductor within a helicopter rotor blade;

FIG. 6 shows seven inductors distributed along the leading edge, and along the suction side—or along the pressure side;

FIG. 7 shows seven inductors as shown in FIG. 5, that are regularly distributed along the leading edge;

FIG. 8 shows a blade fitted with a single inductor extending along a substantial portion of the length of the blade.

MORE DETAILED DESCRIPTION

Figure 1:
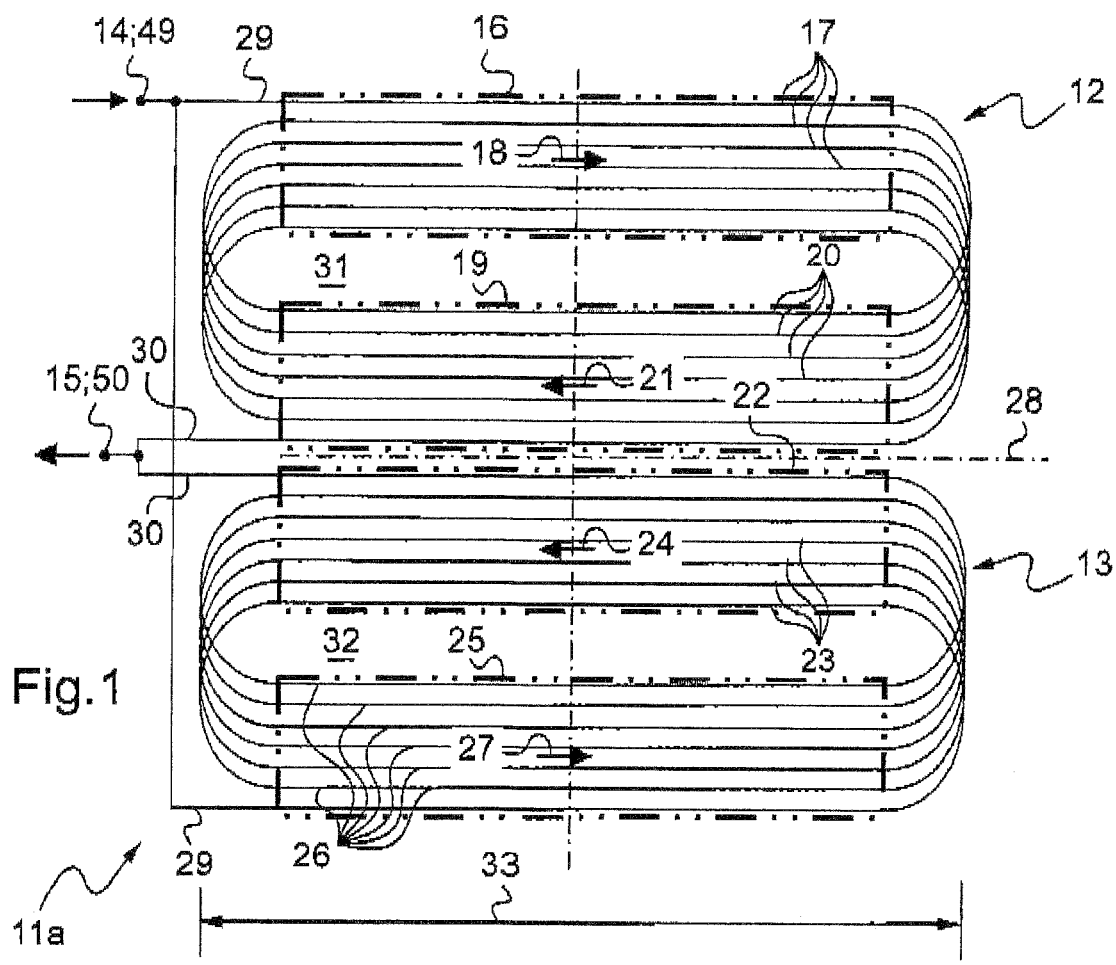
FIG. 1 is a diagram showing an inductor constituted by two thin juxtaposed coils.

In accordance with an aspect of the invention, the system for de-icing the blades of a helicopter by induction comprises inductors embedded in the blade that, once subjected to alternating-current at high-frequency, emit a magnetic field from the center of the blade towards the outside. The magnetic field then induces currents in the metal cover protecting the leading edge (which cover is made of an electrically-conductive material).

By subjecting the electrically-conductive material covering the leading edge to a varying magnetic field, the variation in the magnetic flux induces electromotive forces within the material (Lentz's law) that give rise to induced currents (eddy currents). The eddy currents then heat the material of the cover by the Joule effect.

At high frequency, a harmful phenomenon known as the "skin" effect can disturb the distribution of current densities within the inductors: the currents within the material that is to be heated often penetrate only part of the way into the inside of thereof; on penetrating into the material, the magnitude of the field decreases in application of an exponential relationship, and causes the density of the induced currents to be concentrated in the surface layer; this phenomenon can be attenuated and/or avoided by making the inductors using Litz wires (wires of twisted strands) enabling uniform current density to be obtained within the sheets of the coils/inductors by defining and controlling the shapes of the Litz wire circuits so as to obtain field lines that are uniformly distributed over the metal cover.

When the frequency of the induction current increases from a value close to 10 kHz to a value close to 70 kHz or more, the field lines become concentrated around the inductor. In order to make the distribution uniform so that there are no zones of the cover through which field lines pass, it is preferable to use an inductor comprising two coils in which the four sheets form three flat conductors (induction elements) that are placed one on the leading edge itself, with the other two on the opposite sides (pressure side and suction side) of the leading edge, each sheet and/or coil presenting thickness of the order of one or several millimeters.

In certain configurations, it has been observed that the power dissipated in the plate or the sheet of the secondary circuit (cover) decreases with the number of sheets of the induction circuit. It is found that when going from a system having a single sheet to a system having two sheets, one conducting current in a "positive" direction and the other in an opposite ("negative") direction, the sheets respectively induce negative and positive currents in the plate. These two currents meet in the plate over the interface between the two sheets, and in this zone they cancel so as to present a current density of zero, thereby reducing the power dissipated in the plate.

The greater the distance between the sheets and the secondary circuit, the smaller the power dissipated therein. It is therefore preferable to place the sheets of the inductor as close as possible to the cover.

It is thus possible to obtain effective heating of the cover, making it possible for example, when starting with the cover at an initial temperature of −40° C., to reach a surface temperature of 10° C. after heating for a few seconds at a current density of $4\times10^6$ amps per square meter (A/m$^2$).

Powering the inductors by means of a few strands (e.g. 3 strands) of "Litz" wire, enables the current fed to the loops to be reduced to below 100 amps (A), in particular to a few amps, e.g. about 5 Å to 10 Åapproximately, while the total current flowing in each sheet of the inductor is much greater, for example about 400 A.

In order to enable the leading edge to be decided in localized and cyclical manner, it is possible to place a plurality of inductors along the leading edge, as shown for example in FIG. 6 or 7.

The induction heater system included in the blade can also be used as a device for removing the protective cover from the leading edge when the cover presents a significant level of erosion or impacts and needs to be replaced. Since the leading edge is held on by a hot melt adhesive having a softening temperature that is lower than the maximum temperature that the plate can reach under the effect of the electromagnetic induction system, it is possible, during blade maintenance, to heat the leading edge until it can be removed by being peeled off, for example as described in greater detail in patent FR-2 767 366 and U.S. Pat. No. 6,470,544.

The induction heater system included in the blade can also be used to deliver heat for polymerizing the leading edges quickly when performing a rapid repair, with heating being controlled as a function of the polymerization kinetics of the adhesive.

Furthermore, activating the induction system at fairly low current levels, possibly in the absence of any ice, can be used to perform electromagnetic jamming so as to avoid the rotorcraft being detected by enemy equipment.

With reference to FIG. 1 in particular, the inductor 11a comprises two coil 12 and 13 that are electrically connected in parallel to terminals 14 and 15 of an AC source (not shown).

The coil 12 comprises a first sheet 16 of electrically-conductive strands 17 in which current flows in a direction 18, and a second sheet 19 of conductive strands 20 in which current flows in a direction 21 opposite to the direction 18.

Similarly, the coil 13 comprises a first sheet 22 of electrically-conductive strands 23 in which current flows in a direction 24, and a second sheet 25 of conductive strands 26' n which current flows in a direction referenced 27.

The strands 17 and 20 are connected together and form loops or turns of the coil 12; the strands 23 and 26 are likewise connected together and form the loops of the coil 13.

The strands 17, 20, 23, and 26 and the sheets 16, 19, 22, and 25 extend parallel to the axis 20.

Figure 2:
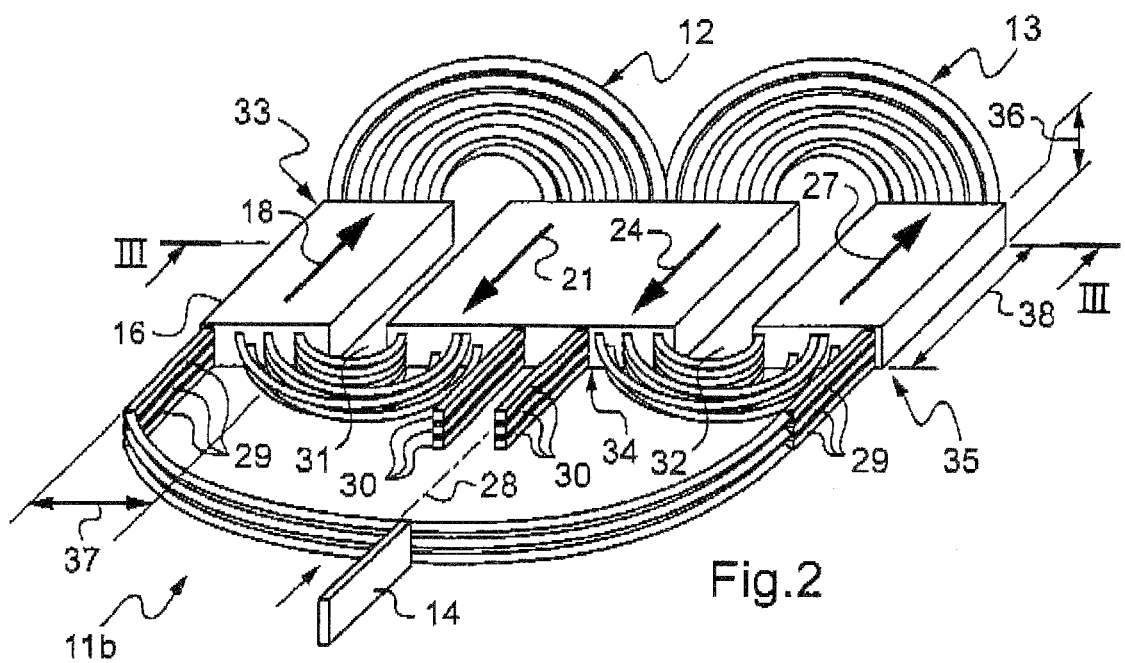
FIG. 2 is a diagrammatic perspective view showing an inductor comprising two juxtaposed coils, together with the conductors for connecting the inductor to a source of electric current.

By "stacking" three thin inductors 11a of the kind shown in FIG. 1, an inductor 11b of the kind shown in FIG. 2 is obtained, in which each coil is fed by three conductors 29, 30.

In FIGS. 1 and 2, it can be seen that the two central sheets 19 and 22 are touching, while the sheets 16 and 25 are separated from the sheets 19 and 22 respectively by two spaces 31 and 32.

When the sheets are coated in resin 39 and/or embedded in three structures 33, 34, and 35 of (insulating) composite material represented diagrammatically by rectangular parallelepipeds (cf. FIG. 3), these three inductor elements (33 to 3$5) are placed at a short distance 40 from the ferromagnetic plate/cover 41 that is to be heated by induction; this distance is preferably of the order of about 0.1 mm to about 3 mm, in particular of the order of about 0.1 mm to about 1 mm.

The thickness 36 of each coil 12, 13 and of each element 33, 34, and 35 can be of the order of about 1 mm to about 2 mm; the width 37 of each coil and of each element 33, 34, and 35 may be of the order of about 10 mm to about 50 mm; the length 38 may lie in the range a few millimeters to several meters depending on the selected configuration (cf. FIGS. 6 to 8).

With reference to FIGS. 4 and 6 to 8, the blade 42 presents a pressure side 43, a suction side 44, a leading edge 45, and a trailing edge 46.

With reference to FIG. 4 in particular, a metal cover 41 covers the leading edge and "front" portions of the pressure and suction sides 43 and 44, and serves to protect them from impacts.

The elements 33 to 35 of an inductor are housed in the composite structure 47 of the blade, and they extend in register with and at a short distance from the cover 41.

The inductor is connected to the two feed conductors 49, 50 that extend longitudinally relative to the longitudinal axis 46 of the blade 42, by means of the conductors 29 and 30 respectively.

With reference to FIGS. 4 and 5 in particular, while the two inductor elements 33 and 35 are in form of thin plates that are substantially plane or slightly curved, the central inductor element 34 is in the form of a curved thin plate or shell that matches the shape of the front portion of the cover 41.

Although the sheets of inductors extend perpendicularly to the longitudinal axis 43 of the blade in the embodiment shown in FIG. 6, the sheets of inductors extend parallel to said axis in the embodiments shown in FIGS. 7 and 8.

In these three embodiments, the inductors extend—continuously in FIG. 8 and discontinuously in FIGS. 6 and 7—along the leading edge 45 and the axis 48 in substantially regular manner over a large fraction of the length of the blade, between its two ends (blade root 52 and tip 51).

The conductors 49 and 50 are brought together in a bas 53 which acts via rotary slip-rings (not shown) to feed the inductors with current from a power supply on board the rotorcraft.

What is claimed is:

1. A device for de-icing an aircraft wall, the wall comprising a composite structure (47) with a skin (41) constituted by an electrically-conductive material, in particular of metal wherein:
    the device comprises a plurality of thin inductor elements (33 to 35) that are designed to extend substantially parallel to the layer of conductive material, at a distance (40) therefrom that is sufficiently small to ensure that when the inductor is powered by a source of AC at a suitable frequency, the layer heats quickly and uniformly without significantly heating the composite structure;
    the inductors are in the form of at least one of a plate and a shell and comprise coils (12, 13) of conductive wire that are flat and that comprise a number of turns;
    the thickness of at least one of a coil and of an inductor is one of less than $1/10$ its diameter and an equivalent diameter; and
    each coil is elongate in shape along an axis (28) and comprises two sheets (16, 19, 22, 25) of one of braided and twisted wires that extend substantially parallel to the axis of the coil, the two sheets being separated by a space (31, 32) having no inductor wires.

2. The device according to claim 1, wherein each inductor comprises two juxtaposed coils, each sheet of each coil comprising at least twenty and less than a thousand portions of braided wire.

3. The device according to claim 1, wherein each inductor coil comprises a plurality of at least twenty turns that are one of side by side and interleaved.

4. The device according to claim 1, wherein each inductor coil comprises a plurality of at least two hundred turns that are one of side by side and interleaved.

5. The device according to claim 1, wherein the inductors comprises a fabric insulating fibers and of conductive wires.

6. The device according to claim 1, wherein the inductors comprises a fabric of insulating fibers and of conductive wires with one of weave and stitch of one of a serge, taffeta, satin, and hybrid type.

7. The device according to claim 1, wherein the diameter of the conductor wire used for forming the inductors is about 0.2 mm to about 1 mm.

8. The rotorcraft rotor blade (42) that incorporates a device according to claim 1.

9. The blade according to claim 8, that includes further comprising: a single inductor extending along a substantial portion of the length of the blade, along the leading edge (45).

10. The blade according to claim 8, that includes further comprising: a plurality of inductors extending along a substantial portion of the length of the blade, along the leading edge.

11. A method of de-icing an aircraft wall wherein use is made of a device according to claim 1, wherein the inductors are powered with electric current at a frequency lying in the range 10 kHz to 100 kHz.

12. The method according to claim 11, wherein the inductors are fed with electric current of less than 100 A.

13. The method of de-icing an aircraft wall wherein use is made of a device according to claim 11, wherein the inductors are powered with electric current at the frequency lying in the range 40 kHz to 70 kHz.

14. The method of de-icing an aircraft wall wherein use is made of a device according to claim 13, wherein the inductors are powered with electric current at a frequency close to 50 kHz.

15. The method of repairing an aircraft wall wherein use is made of a device according to claim 1.

16. The method of modifying the electromagnetic signature of an aircraft wherein use is made of a device according to claim 1, wherein the induction system is activated at low current levels.

17. An aircraft part (42) comprising a composite structure comprising reinforcement embedded in a resin, together with an electrically-conductive skin (41) covering a portion of the composite structure, wherein:

the aircraft part includes inductors (33 to 35) placed within the composite structure, electrically insulated from the skin by the resin, and designed to cause the skin to heat by induction when powered;

the inductors are in the form of at least one of a plate and a shell and comprise coils (12, 13) of conductive wire that are flat and that have a number of turns;

the thickness of at least one of a coil and an inductor is one of less than one-tenth its diameter and an equivalent diameter; and each coil is elongate in shape along an axis (28) and comprises two sheets (16, 19, 22, 25) of one of braided and twisted wires that extend substantially parallel to the axis of the coil, the two sheets being separated by a space (31, 32) having no inductor wires.

18. The part according to claim 17, in which wherein the coils and the inductors are shaped to extend in part along a plane surface and in part along a surface in the form of a portion of one of a cylinder and a shell that fits closely to the skin for heating.

* * * * *